Figure 1:
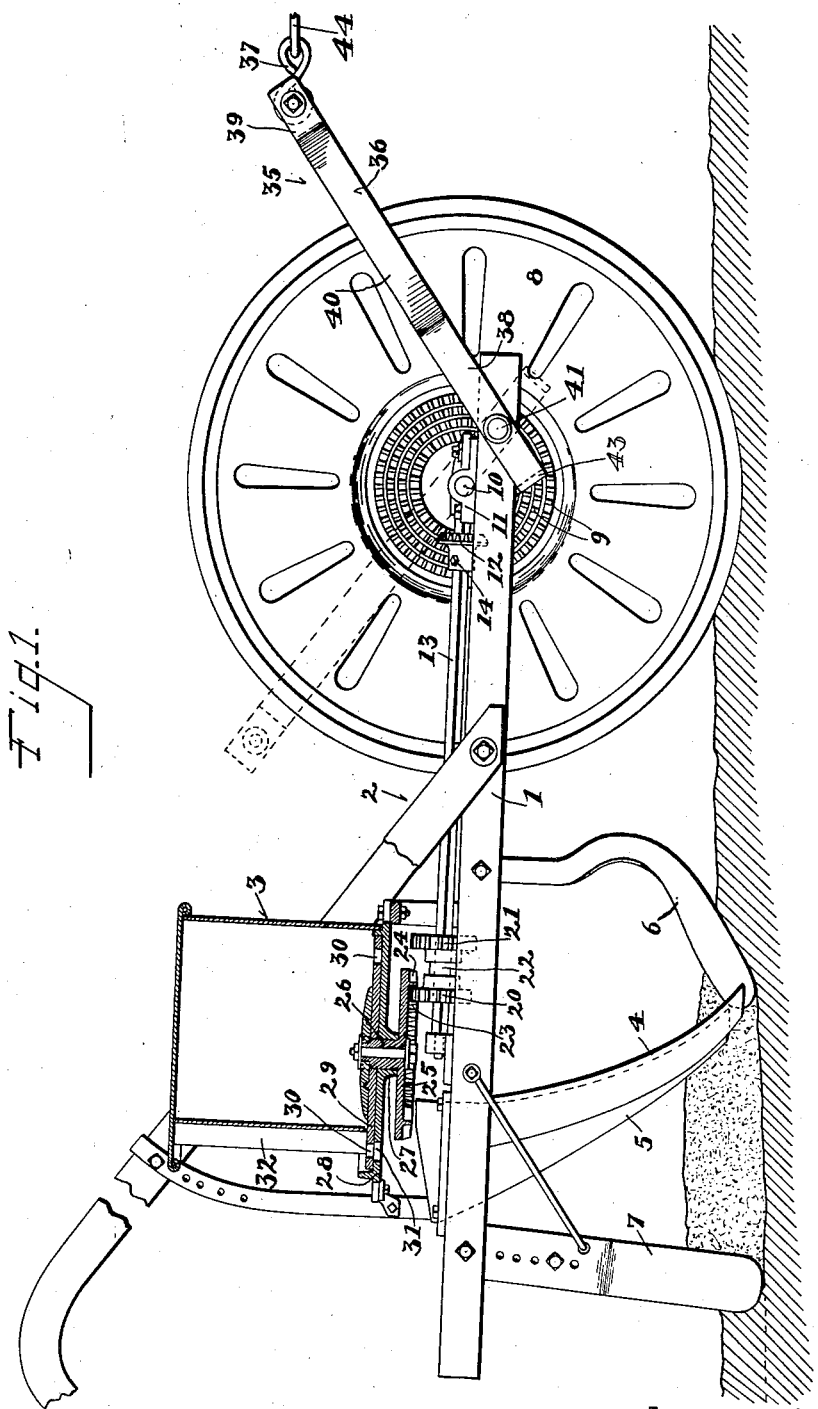

A. M. CAMPBELL & I. HOWARD.
SEED DRILL.
APPLICATION FILED OCT. 3, 1908.

936,408.

Patented Oct. 12, 1909.
2 SHEETS—SHEET 1.

Witnesses.
A. Brandes
Lillian Burnett

Inventors
Albert M. Campbell,
Isaac Howard,
by their Attorney.

A. M. CAMPBELL & I. HOWARD.
SEED DRILL.
APPLICATION FILED OCT. 3, 1908.
936,408.
Patented Oct. 12, 1909.
2 SHEETS—SHEET 2.
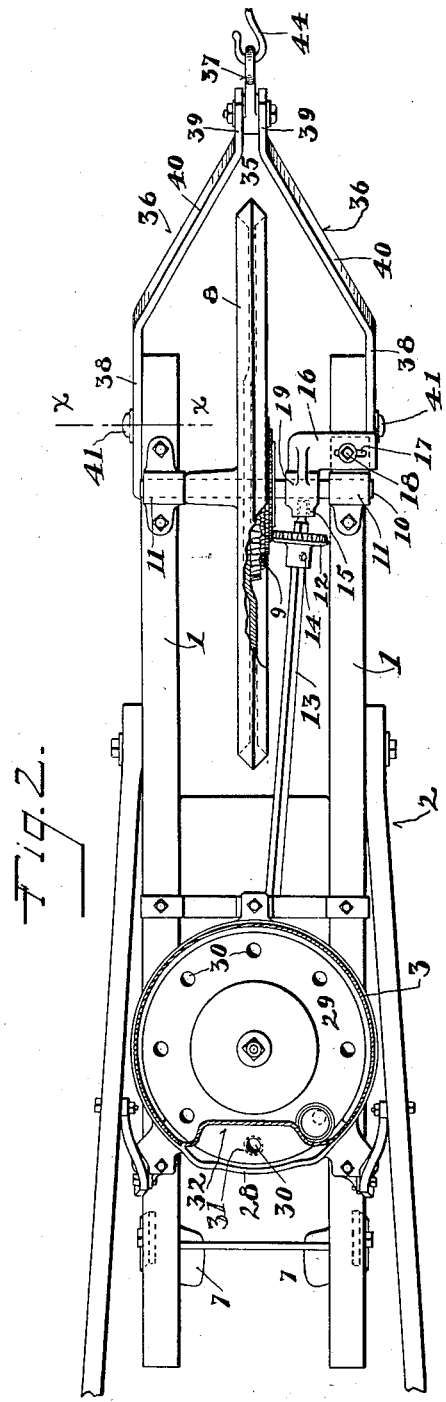
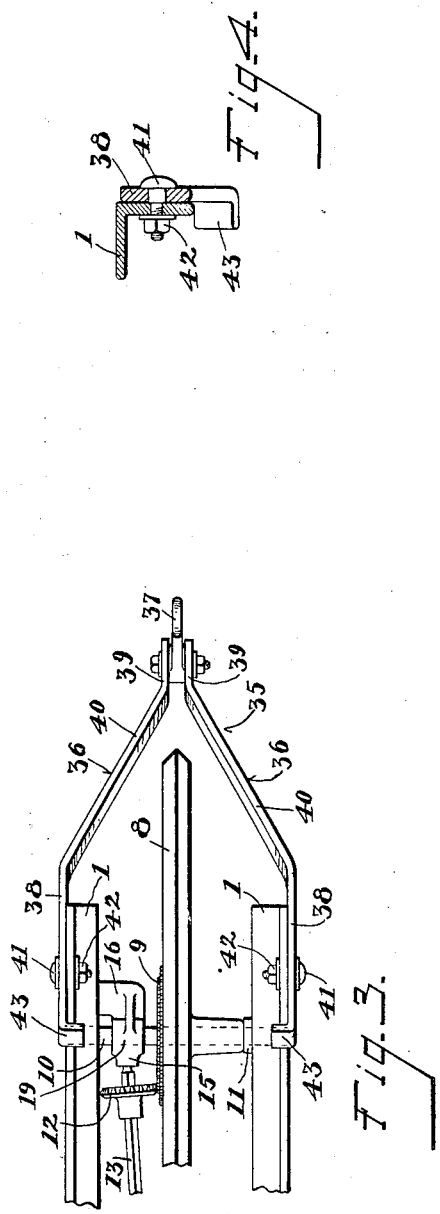

UNITED STATES PATENT OFFICE.

ALBERT M. CAMPBELL, OF HARRISON, OHIO, AND ISAAC HOWARD, OF WEST HARRISON, INDIANA, ASSIGNORS TO ALBERT M. CAMPBELL AND HARRY O. CAMPBELL, OF HARRISON, OHIO, AND ELMOR E. CAMPBELL, OF WEST HARRISON, INDIANA, PARTNERS DOING BUSINESS UNDER THE FIRM-NAME OF CAMPBELL CORN DRILL CO.

SEED-DRILL.

936,408.  Specification of Letters Patent.  Patented Oct. 12, 1909.

Application filed October 3, 1908. Serial No. 455,944.

*To all whom it may concern:*

Be it known that we, ALBERT M. CAMPBELL and ISAAC HOWARD, citizens of the United States, residing, respectively, at Harrison, in the county of Hamilton and State of Ohio, and at West Harrison, in the county of Dearborn and State of Indiana, have jointly invented certain new and useful Improvements in Seed-Drills, of which the following is a specification.

Our invention relates to seed drills, such as corn or cotton drills, and the like, and has for its object the providing of means, in a machine of this character, whereby uniform dropping of the seeds is caused by imparting reliable traction to the traction drive-wheel through which the seed-dropping mechanism is operated, and the invention will be readily understood from the following description and claims, and from the drawings, in which latter:

Figure 1 is a side elevation of our improved device, partly broken away for better illustration of parts. Fig. 2 is the plan view of the same partly broken away. Fig. 3 is a bottom view of the hitching-clevis, showing its attachment to the side-bars of the frame; and, Fig. 4 is a detail of the same in vertical section on the line $x$—$x$ of Fig. 2.

1 represents the side-bars of the frame 2, the frame supporting the seed-box 3, and the furrow-opening and closing devices, as instanced by the furrow-opener 4, to rear of which the seed-spout 5 is located, the colter 6 aiding in opening the furrow and protecting the passage of the seeds from the seed-spout into the furrow, and the covering blades 7 closing the furrow. The seeds are directed from the seed-box through the seed-spout into the furrow, and it is important in successful sowing that the seeds shall be regularly and equidistantly dropped into the furrow.

8 is a traction drive-wheel, which may have a series of gears 9, of different diameters, cast integral therewith or secured thereto. The traction drive-wheel is on a shaft or axle 10 journaled in bearings 11 bolted to the side-bars of the frame. A pinion 12 is arranged to be placed in mesh with any of the series of gears 9, as by being mounted on a shaft 13, on which shaft the said pinion is longitudinally adjustable, the pinion being secured in adjusted position by a set-screw 14. The front end of said shaft is journaled in a bearing 15, which is adjustable toward and from the traction drive-wheel for causing proper mesh between said pinion and any of the series of gears 9. The bearing 15 is on a plate 16 in which there is a slot 17 through which the bolt 18 is received for clamping the plate in place after adjustment. This plate may also have a bearing 19 thereon by which it is steadied about the shaft 10. The shaft 13 also carries pinions 20 and 21 which are preferably cast integral with a collar 22 which is movable longitudinally of said pinion-shaft 13 in any suitable manner for causing said pinions 20 21 to respectively mesh with the teeth 23 or 24 of a gear 25 which has a hub 26 journaled in a bearing 27 of the bottom-plate 28 of the seed-box 3 and secured to the seed-plate 29 in suitable manner for causing rotation of said seed-plate from the traction drive-wheel at the speed determined by the adjustment of said pinions 12 20 and 21.

The seed-plate is provided with apertures 30 for feeding the seeds above and into registry with the aperture 31 in the bottom-plate of the seed-box, the aperture 31 being located above the mouth of the seed-spout for delivering the seeds into the spout and through it into the furrow. The rear of the seed-box is provided with an outer recess 32 into which that part of the seed-plate which carries the seed passes when delivering the seed. Suitable seed-brushing and ejecting mechanism may be also provided.

It has been an objection heretofore in seeding machines of the character described that the traction drive-wheel failed to have proper traction upon the ground, in consequence of which its rotation was irregular on account of its sliding over the ground instead of turning in passing over the same, the result being irregularity in dropping of seeds on account of the seed-plate in the bottom of the seed-box failing to rotate when the traction drive-wheel slides upon the ground. The consequence of such irregularity in the dropping of seeds was a failure to drop seeds throughout spaces in the furrow in which seeds were intended to be received, the irregular spacing of the growing plants and consequent difficulty in cultivating the same, a waste of ground under cultivation, and smaller crops. We avoid these objections in our improved device in which we secure a clevis 35 to the forward ends of the side-bars, the said clevis preferably comprising side-arms 36, to which a hitching-part, shown as a hitching-ring 37, is secured.

The side-arms preferably comprise rear portions 38 which are parallel with the side-bars, and forward portions 39 parallel with each other, with intermediate diagonal portions 40. The side-bars are preferably formed of inverted L-shaped metal, one of the limbs of which is vertically disposed at the outside face of each side of the frame, thereby forming bearing faces for the rear portions 38 of said side-arms for steadying the same laterally. The side-arms are pivoted to said side-bars on bolts 41, shown as shoulder-bolts secured to the side-bars by nuts 42, and the side-arms are so arranged as to be limited in their forward position to an upwardly extending inclination. For so limiting the side-arms their inner ends are preferably provided with inwardly extending lugs 43 which are received under the side-bars of the frame. These lugs are preferably the bent-in inner ends of said side-arms. The arrangement is such that the side-arms extend upwardly and forwardly at an angle when the lugs 43 are in contact with the lower faces of the side-bars in rear of their pivots, which brings the hitching-ring substantially above the level of the side-bars so that a forward pulling strain on the same by the horse, indicated by the position of the hitching-hook 44, is communicated through the hitching clevis to the side-bars in such a way that the tendency is to push the traction drive-wheel downwardly into the ground for causing firm traction between the periphery of the wheel and the ground. In this manner the sliding of the traction drive-wheel over the ground is prevented and regular rotation is imparted to the seeding mechanism, causing seeds to fall at regular predetermined distances from one another. The side-arms of the clevis named may also be swung back rearwardly on their pivots as shown in dotted lines in Fig. 1, and when in this position the end lugs 43 thereof contact the lower faces of the side-bars in front of the pivots of said side-arms for limiting the rearward movement of their upper swinging ends.

Having thus fully described our invention, what we claim as new and desire to secure by Letters Patent, is:

1. In a seed drill of the character described, the combination of a frame, a traction drive wheel, a bifurcated hitching clevis pivoted to said frame and having inwardly extending lugs at the lower ends of its bifurcations received under said frame and limiting the forward position of said clevis to an upward inclination, substantially as described.

2. In a seed drill of the character described, the combination of a frame, a traction drive wheel, a bifurcated hitching clevis pivoted to said frame and having inwardly extending lugs at the lower ends of its bifurcations received under said frame and limiting the forward position of said clevis to an upward inclination, the upper end of said hitching clevis being arranged to be swung rearwardly, when said lugs are received under said frame forward of the pivotal point of said hitching clevis, substantially as described.

3. In a seed drill of the character described, the combination of a frame comprising side bars, a traction drive wheel, a hitching clevis comprising side-arms respectively having lower portions substantially parallel with said side-bars, hitching means on said hitching clevis, pivoting means between said side-arms and side-bars preventing lateral displacement between the same, the said lower portions of said side-bars being braced laterally by the sides of said respective side-bars, and means for limiting the forward position of said side-arms to an inclination at which the said hitching means on said hitching clevis are raised substantially above said side-bars.

4. In a seed drill of the character described, the combination of a frame comprising side bars, a traction drive wheel journaled on said frame, a hitching clevis comprising side-arms between which said traction drive-wheel is located, a hitching part for said clevis, means for pivoting said respective side-arms to said respective side-bars, the lower ends of said side-arms being provided with lugs which extend toward each other under said side-bars and are so located with relation to the pivots of said side-arms that when the latter are in forward position the said lugs will extend rearwardly of said pivots and said arms extend upwardly at an inclination for locating said hitching means substantially above said side-bars, and when said side-bars are swung rearwardly the said lugs will extend forwardly of the pivots of said side-arms and said side-arms be limited by said side-bars for permitting said side-arms to rest in rearwardly swung position, substantially as described.

5. In a seed drill of the character described, the combination of a frame, a traction drive wheel therefor, and a clevis pivoted to said frame intermediate the ends of said clevis, said clevis being provided on one side of its pivotal point with means adapted to engage the said frame to maintain its other end in an upward position for hitching.

6. In a seed drill of the character described, the combination of a frame, a traction drive wheel therefor, and a clevis pivoted to said frame intermediate the ends of said clevis, said clevis being provided on one side of its pivotal point with means adapted to engage the said frame to maintain its other end in an upward position for hitching, said means also being adapted to engage the frame and maintain the hitching end of the clevis in rearward disposition when thrown back.

In testimony whereof, we have subscribed our names hereto in the presence of two subscribing witnesses.

ALBERT M. CAMPBELL.
ISAAC HOWARD.

Witnesses:
 FRANCIS HOLLOWELL,
 C. E. HADDOCK.